United States Patent [19]

Skidmore

[11] Patent Number: 5,138,841

[45] Date of Patent: Aug. 18, 1992

[54] GAS TURBINE ENGINES

[75] Inventor: Francis W. Skidmore, Fishermans Bend, Australia

[73] Assignee: The Commonwealth of Australia, Canberra, Australia

[21] Appl. No.: 517,712

[22] Filed: May 2, 1990

[30] Foreign Application Priority Data

Jan. 23, 1990 [AU] Australia .................. PJ8309

[51] Int. Cl.$^5$ .............................. F23R 3/06
[52] U.S. Cl. .................................. 60/752
[58] Field of Search .................. 60/752, 748, 759, 737

[56] References Cited

U.S. PATENT DOCUMENTS 3,643,430  1/1972  Emory, Jr. et al. .................. 60/748
4,301,657  11/1981 Penny .................................. 60/759

Primary Examiner—Richard A. Bertsch
Assistant Examiner—Timothy S. Thorpe
Attorney, Agent, or Firm—Roylance, Abrams, Berdo & Goodman

[57] ABSTRACT

A modified Allison T56 turbo prop engine having reduced smoke emission and improved fuel economy. The air inlet apertures in primary combustion zone of the combustion liners are enlarged and shaped to allow more air to enter the combustion zone.

2 Claims, 11 Drawing Sheets

FIGURE. 3A
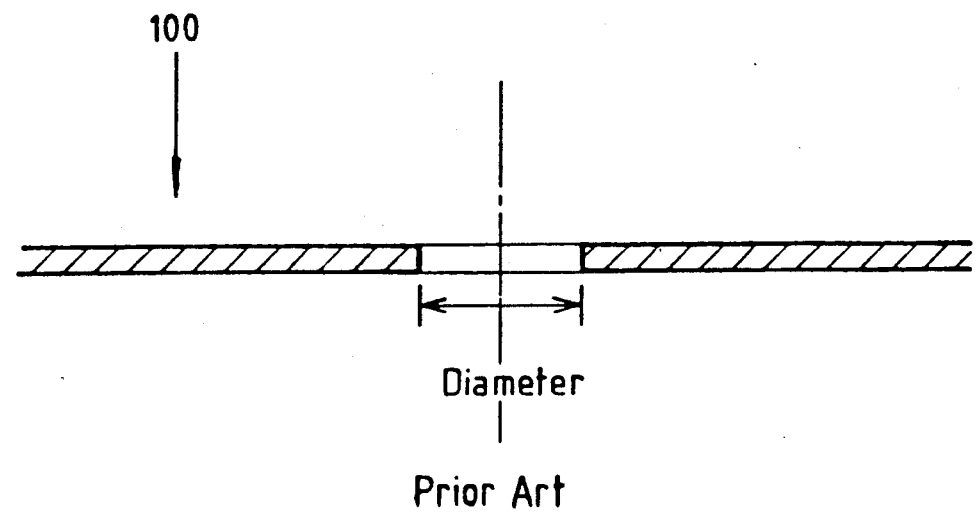
Prior Art
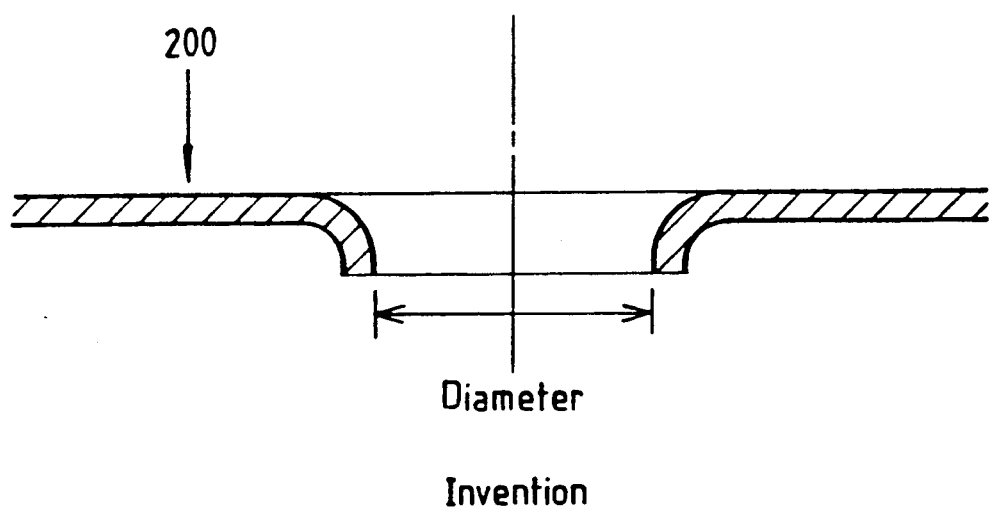
Invention
FIGURE. 3B

GAS TURBINE ENGINES

The present invention relates to improvements to gas turbine engines, and more particularly, but not exclusively to improvements to Allison T56 turbo prop gas turbine engines.

The problem of excessive smoke and radiation emissions from aircraft having gas turbine engines, particularly those involved in defence-related purposes, has for many years been one of great concern to military personnel. In this regard, the Royal Australian Air Force (RAAF), amongst others, use the P-3C Orion aircraft, which incorporates gas turbine engines, in a multi-role capacity. One of these roles is in the surveillance and detection of submarines. In this role the smoke emissions from the Allison T56-A-14 engines can be clearly seen by submariners. The submarines, however, remain difficult to detect visually by the aircrew even in a calm sea.

The consequences of early detection of surveillance aircraft by submarines are potentially catastrophic in a hostile environment, not only for the immediate aircrew but also for the territory being safeguarded by the surveillance aircraft.

Unfortunately, whilst many have grappled with the problem, to date no adequate solution has been proposed for the reduction of smoke emissions from the engines of these aircraft.

It is thought that some of the main factors influencing smoke emissions from gas turbine combustion systems include:

the chemical composition of the fuel,—in particular the aromatic content and the ratio of hydrogen to carbon, the physical design characteristics of the combustor, and, fuel atomisation and mixing of fuel and air.

As a result of this problem, Applicant investigated methods of reducing the smoke emissions from the Allison T56 engines to an acceptable level.

It is accordingly an object of the present invention to alleviate the aforementioned disadvantage of the prior art.

In accordance with the foregoing and in one aspect of the present invention, in a gas turbine engine of the type comprising a can-annular combustion system having a plurality of combustion liners, said combustion liners including primary, secondary and dilution zones having apertured air inlets, the improvement wherein the effective area of the air inlet apertures in the primary zone of the combustion liner(s) is increased.

In another aspect of the present invention, in a gas turbine engine of the type comprising a can-annular combustion system having a plurality of combustion liners including primary, secondary and dilution zones having apertured air inlets, the improvement wherein the air inlet apertures in the primary zone are enlarged and profiled to influence the flow of air into the combustion liner(s).

It is preferred that the air inlet apertures be substantially circular. For circular apertures, the diameter is advantageously increased by at least 50% compared to the diameter of the apertures of a standard combustion liner. The diameter of the apertures is preferably in the range of from 9 to 15 mm, more preferably in the range of from 10 to 12 mm.

The apertures are also preferably profiled. The profiling may be in the form of plunging, shaping or flanging inward of the air inlet apertures. The apertures are advantageously profiled with an outside radius of 2 to 4 mm, preferably 3 mm, plus or minus 0.5 mm towards the centre of the liner.

In one preferred embodiment, the profiled aperture is relocated so that the outside diameter is within 0.5 mm to 1 mm of the first cooling corrugation from the front of the liner.

The alteration of the geometry of the air inlet apertures of the combustion liners in accordance with the present invention has been found to substantially improve turbulent mixing of fuel and air within the combustion liner, leading to a desirable reduction in smoke and radiation emissions, without prejudicing combustion or engine efficiency. It is further thought that the enlargement of the existing apertures achieves a leaner combustible mixture in the primary zone of the liner, thereby aiding combustion.

Additionally, the profiling of the apertures is believed to prevent the separation of air admitted by the apertures.

It is to be noted that the apertures cannot be simply enlarged at random in order to reduce the smoke and radiation emissions, as combustion in the engine may be adversely affected leading to flame-out, pulsations or light up problems. Additionally, random enlargement may lead to adverse temperature profiles or hot streaks resulting in premature failure of liners, nozzle guide vanes or turbine blades.

Applicant has discovered that not all of the air inlet apertures in the combustion liners need to be enlarged, and for those that are enlarged it is not simply a matter of increasing their dimension. Rather, the shape of the apertures has to be varied and the apertures also have to be profiled to direct air flow towards certain areas of the combustion liner.

There are considerable advantages to be gained by the improvement according to the present invention. These include:

a reduction in smoke emissions from the Allison T56 turbo prop gas turbine engine due to improved combustion;

the smoke number reduction represents an actual decrease in the mass emissions of smoke of 50% and greater.

The improvement has other benefits in terms of engine performance and maintenance. Specific fuel consumption has been shown to be decreased by at least ½%. Tests on modified production engines have shown an average reduction of 80% on smoke emissions and a 1% saving on fuel. There are additionally indications that the modification has improved the temperature distribution of the burner outlet and decreased the level and variation of metal temperatures of the liner and the hot end.

The invention will now be further described with reference to the accompanying drawings, in which:

FIG. 3A shows a cross-section of an air inlet aperture in the primary zone of a standard liner. FIG. 3B is a cross-section of the improvement to the aperture according to the present invention;

Figure 16:
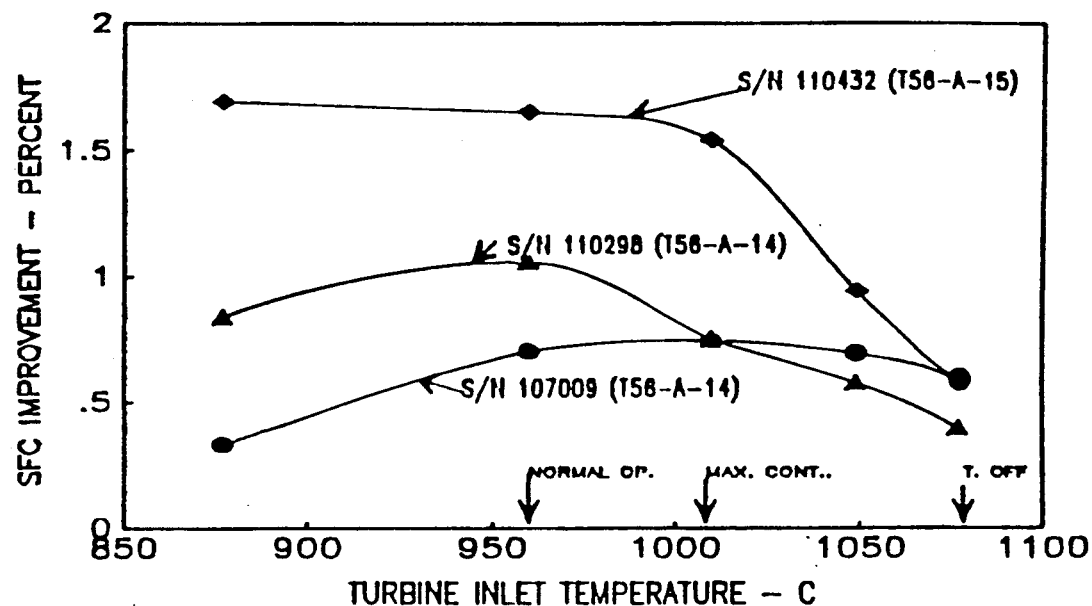
FIG. 16 shows the percentage improvement in corrected specifid fuel consumption versus turbine inlet temperature for three modified engines.
Figure 17:
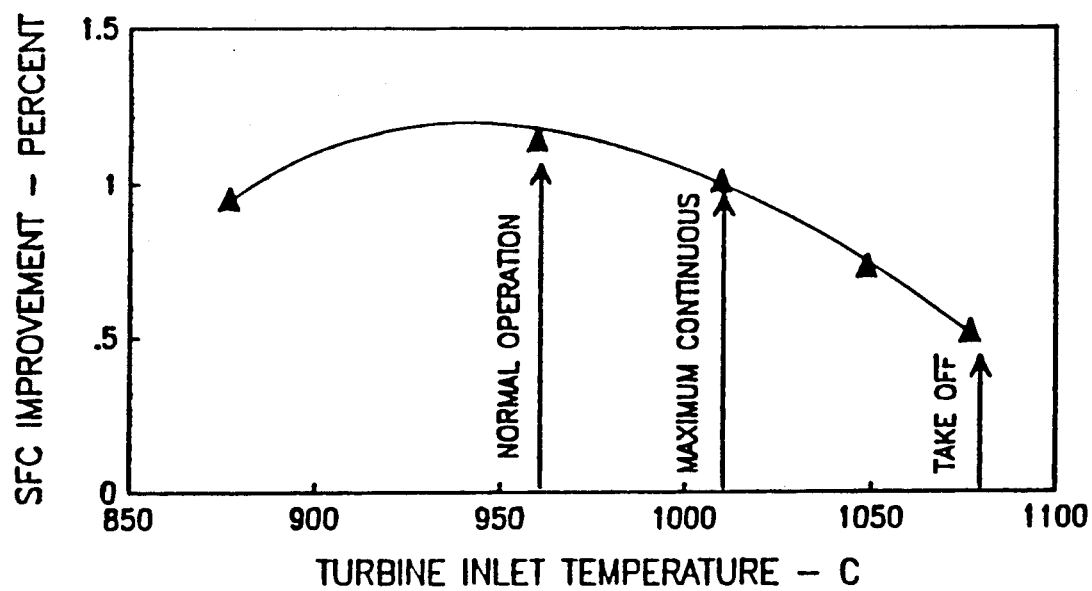

FIG. 17 provides the same information of FIG. 16 averaged for the three engines.

THE ALLISON T56 TURBOPROP ENGINE

The General Motors, Detroit Diesel Allison T56 engine is a single spool gas turbine engine driving a propeller through a reduction gear box. This engine is installed in the Lockheed P-3C Orion and C-130 Hercules aircraft operated by the RAAF. The engine has a 14 stage axial flow compressor with a pressure ratio of 9.5 to 1 that delivers air to a can-annular combustion system. Following the combustors the gases pass through a 4 stage axial flow turbine.

The engine is designed to operate at a constant speed of 13,820 RPM which is controlled by using a variable pitch propeller. This implies that, at any given altitude and speed, airflow and pressure through the engine are constant.

Figure 1:
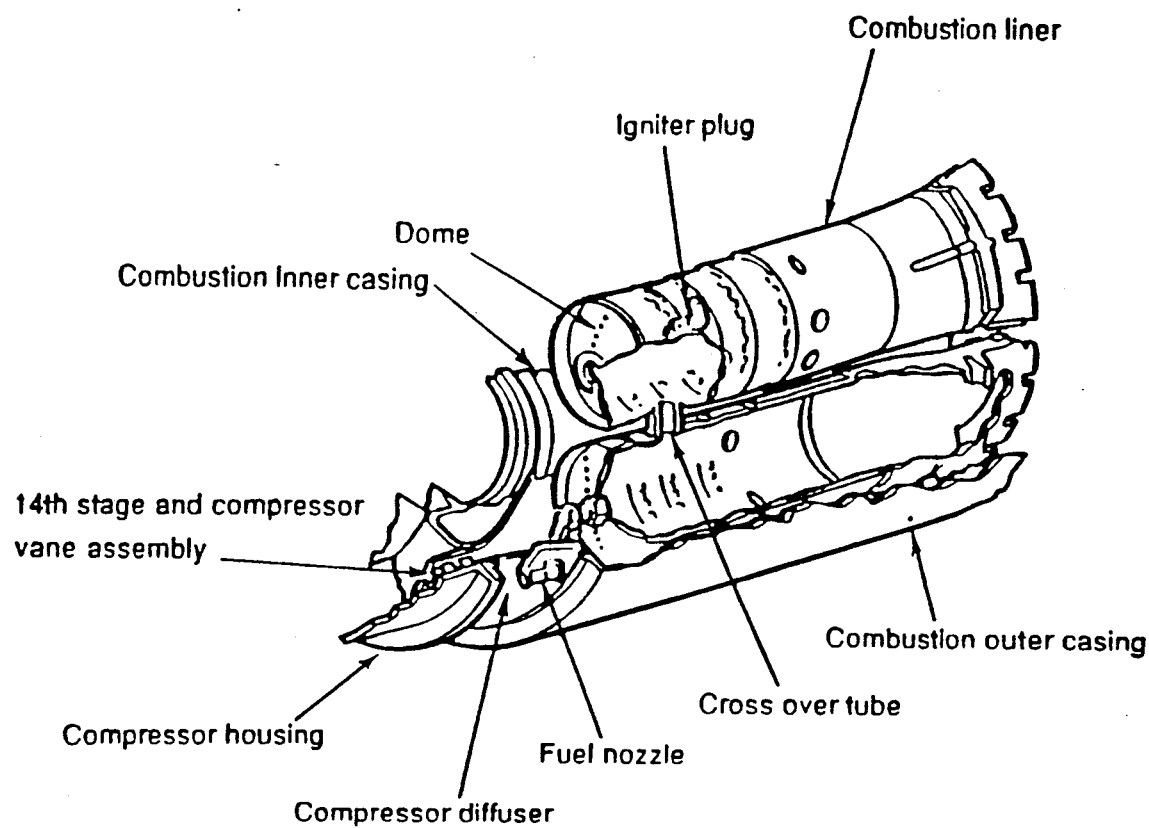
FIG. 1 is a schematic showing details of the Allison T56 combustion chamber.

The combustion system has undergone only minor design changes since the engine was brought into service in the early 1960's. FIG. 1 shows a diagrammatic layout of the combustion system of the engine which consists of:

inner and outer pressure casings that provide both the gas path connection between the compressor and turbine and the mechanical connection, six individual combustor liners that control the airflow distribution and airflow pattern required for stable combustion, and six dual orifice atomisers.

The RAAF operates three variants of the T56 engine as shown in Table 1.

TABLE 1

| T56 ENGINES OPERATED BY THE RAAF | | |
| --- | --- | --- |
| ENGINE TYPE | SERIES | AIRCRAFT |
| T56-A-7B | II | Hercules C-130E |
| T56-A-15 | III | Hercules C-130H |
| T56-A-14 | III | Orion P-3C |

All three versions emit visible smoke but (subjectively) the Series III engine was considered to emit more smoke than the Series II engines. This contention was established as part of the present study. Previous studies showed that the Series II engines have an average SAE smoke number of 45 at maximum power, and the Series III, T56-A-14, engine exhaust smoke number has an average of 50.9 for the same power setting. This can be shown to represent a 50% increase in the mass emissions of smoke particles at that power setting. Further analysis on the smoke emissions from the two series of engines indicates that the Series II engine emits less smoke than the Series III over the entire power range.

The combustion system of the two Series III engines are identical. However, there are certain differences between the Series II and Series III systems. The larger outlet section of the Series III is necessary to accommodate a different turbine and there are variations in the air hole geometry between the liners.

Figure 2A:
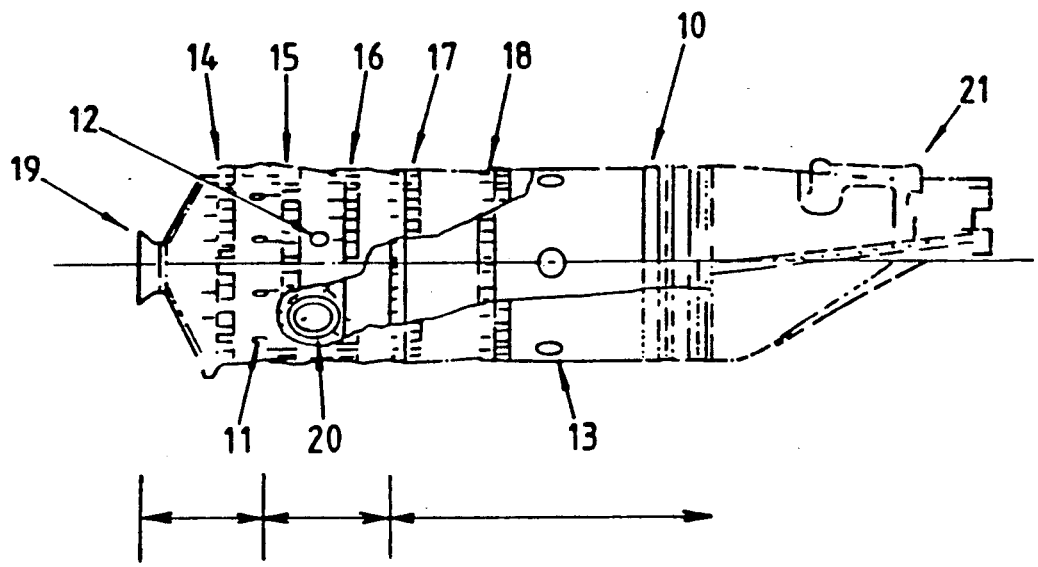
FIGS. 2A and 2B are side views of the configuration of the Allison T56 Series II and III combustion liners, respectively

FIG. 2 shows the configuration of the Allison T56 Series II and III combustion liners.

The combustion liner 10 includes primary, secondary and dilution combustion zones, each zone having a plurality of circumferential air inlet apertures 11, 12 and 13 for the ingress of pressurised combustion air.

Fuel is introduced using a dual orifice atomiser axially of the liner via inlet 19. The fuel and air is mixed and combustion occurs to varying degrees in each of the three combustion zones. Following the combustor the gases pass through the outlet section 21 to a four stage axial flow turbine.

The liner 10 is also provided with cooling corrugations 14, 15, 16, 17 and 18 to assist in the dissipation of heat produced by the combustion of fuel and air. Crossover tube 20 allows for flow communication and an equalisation of pressure between adjacent liners in the can-annular combustion system.

As indicated earlier, there are certain differences between the Series II and Series III systems. The larger outlet section 22 of the Series III combustor is necessary to accommodate a different turbine, and there are also variations in the air hole geometry between the liners.

Turning to FIG. 3A, there is shown a cross-sectional view of one of the air inlet apertures 11 in the primary zone of a standard liner FIG. 3B illustrates the improvement in the aperture according to the present invention.

The standard liner 100 includes apertures having a diameter of 6.35 mm, the apertures being of square profile as shown.

The modified liner 200 has in the embodiment shown a diameter of 11 mm, and is profiled or shaped so as to be flanged inwardly, to direct air flow more effectively into the combustion liner.

Figure 4:
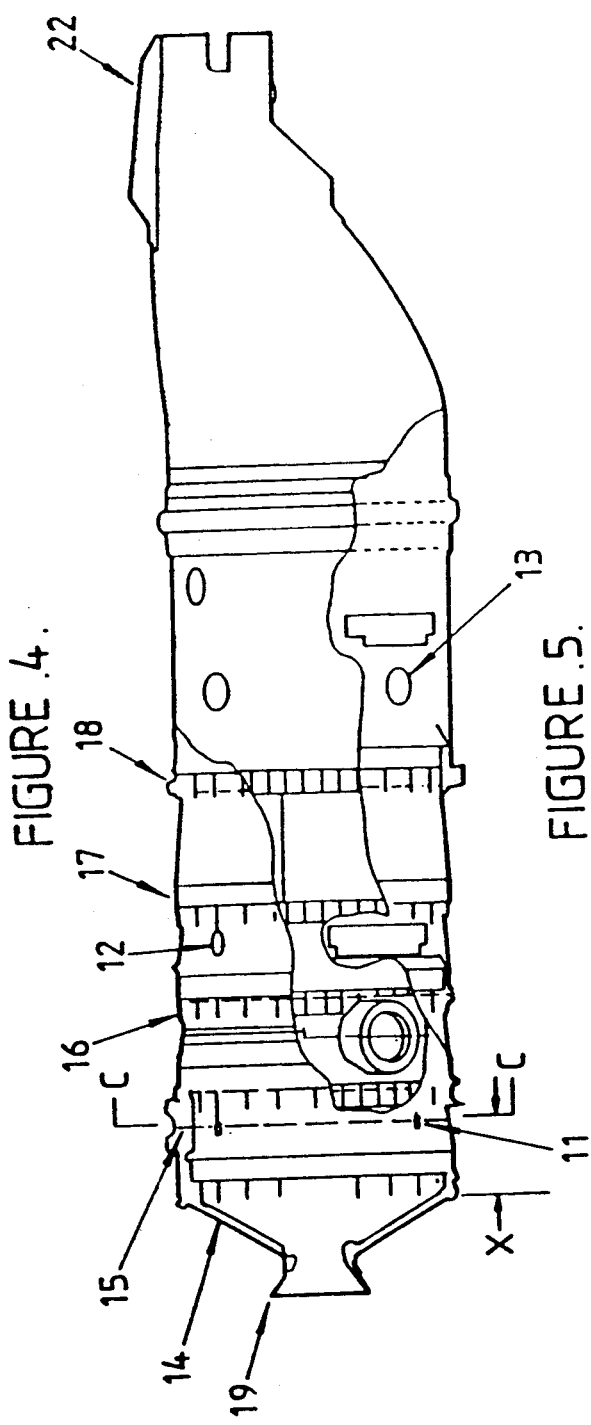
FIG. 4 is a side view of an Allison T56 Series III combustion liner showing the location of the improved air inlet apertures according to the invention.
Figure 5:
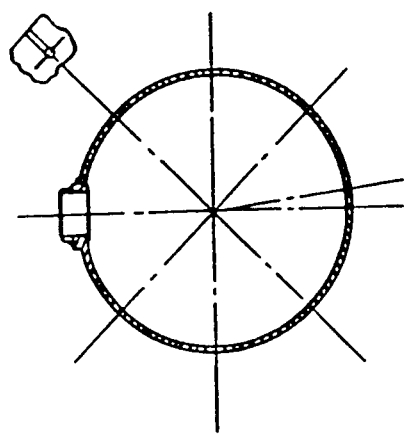
FIG. 5 is a cross-section of the combustion liner of FIG. 4.

FIGS. 4 and 5 are of a combustion liner, showing the location of the air inlet apertures according to the present invention. There are in a standard engine seven holes at the front or primary zone of the combustion liner, which are enlarged to 9 to 15 mm, preferably 11 mm and shaped so as to be flanged inwardly.

The centreline of the hole is relocated so that the outside diameter of the shaped or plunged area is between 0.5 and 1 mm forward of the cooling corrugation on the primary zone for the purpose of carrying out the modification on existing combustion liners. For new liners, the centreline dimension of the modified hole from the front of the liner would be 50.9 mm (dimension "X" FIG. 4) with the standard manufacturing tolerance.

The preferred method of modification for retrofit to existing liners is to hold the liner in a jig mounted on a milling machine to allow the seven holes to be milled to 11 millimeters. The shaping or plunging is preferably carried out using a male and female dye developed for the purpose. Incorporation into the manufacture of new liners would be carried out probably in a simple stamp and plunger operation.

Similar performance of an engine may be possible if a straight hole with a much larger area but no plunging that had the same effective area as the plunged hole. The hole need not be circular but, say, elongated. This approach however may cause problems to the mechanical integrity of the liner.

Figure 2B:
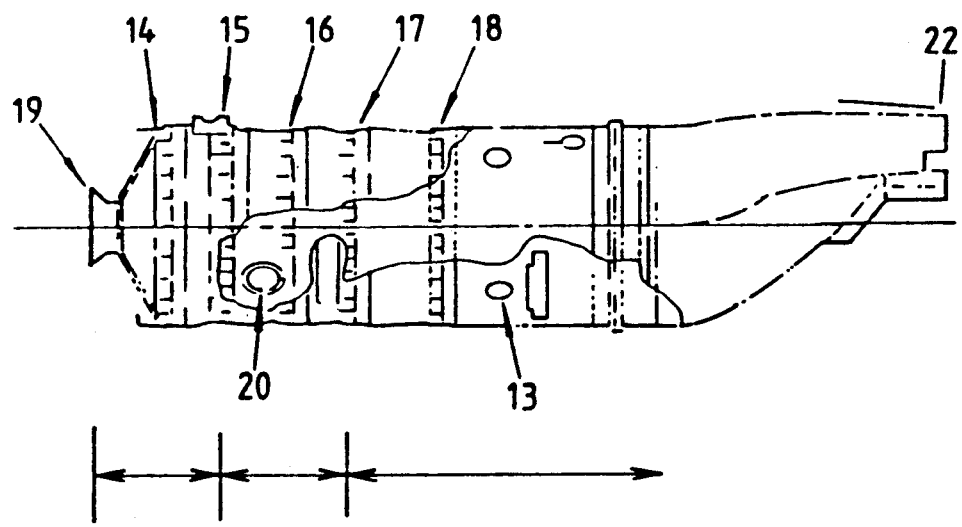

FIGS. 4 and 5 depict a Series III combustion liner, the configuration of which is the same as that described in relation to FIG. 2B.

The line C—C shows the location of the modification to the air inlet apertures in the primary zone. It is preferred that there be seven holes of increased diameter and altered profile, positioned circumferentially of the liner 10.

INITIAL ENGINE TESTS

Scope of Tests

Smoke emission tests were carried out at the RAAF Bases in Edinburgh, South Australia and Richmond, New South Wales on the three variants of T56 engine operated by the RAAF, Table 2 lists the types, series and serial numbers of the subject engines. All engines were tested for smoke emissions using the equipment and procedure described in the SAE's ARP 1179A (1980) over the full operating range from low speed ground idle to full power.

TABLE 2

| T56 ENGINES TESTED | | |
|---|---|---|
| ENGINE TYPE | SERIES | SERIAL NUMBER |
| T56-A-14 | III | AE 110294 |
| T56-A-14 | III | AE 107029 |
| T56-A 15 | III | AE 108518 |
| T56-A 15 | III | AE 110432 |
| T56-A-15 | III | AE 106208 |
| T56-A-7B | II | AE 105574 |
| T56-A-7B | II | AE 106173 |
| T56-A-7B | II | AE 105593 |

Results and Discussions

Figure 6:
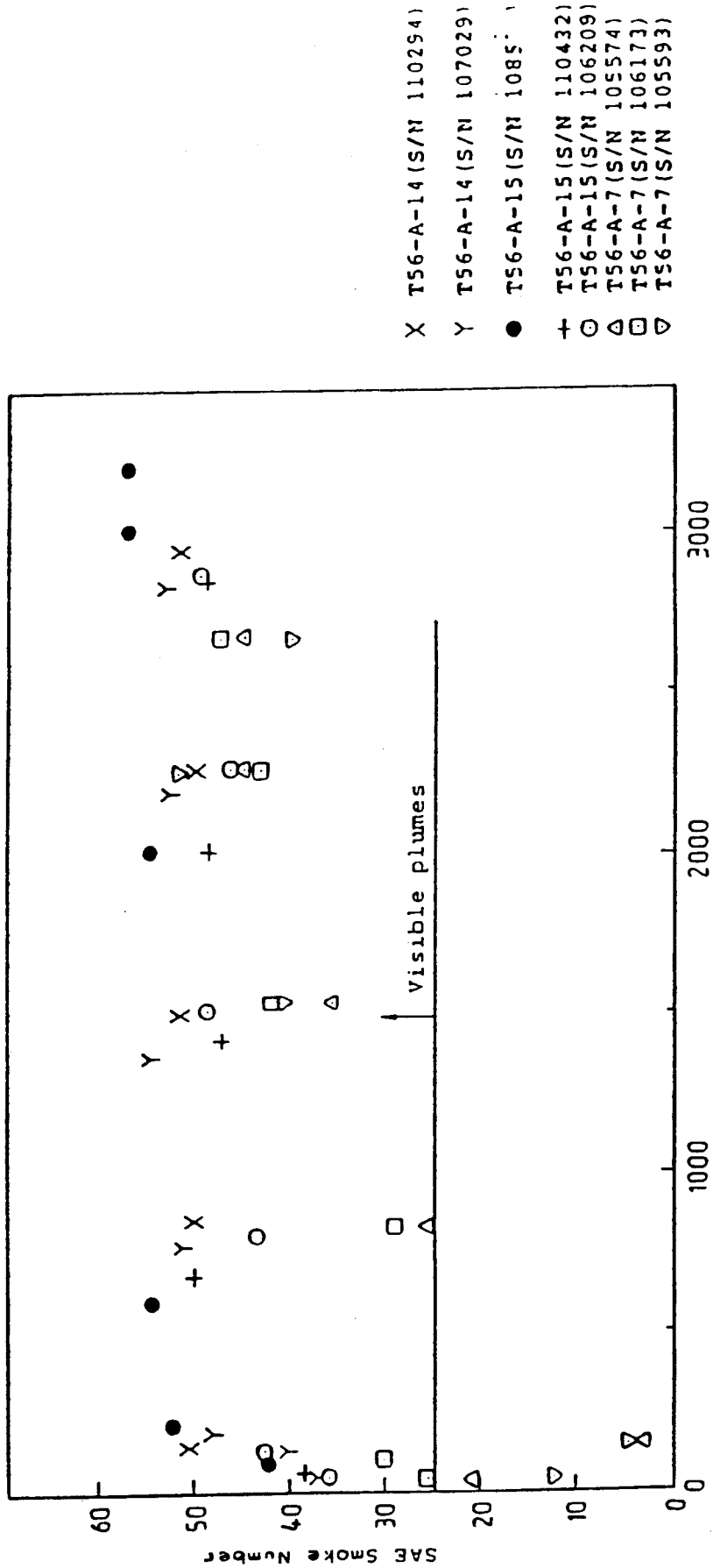
FIG. 6 is a graph of SAE Smoke Number versus Engine Power for several unmodified Allison T56 engines.

Summary data of these tests are presented in FIG. 6 in terms of SAE Smoke Number against Engine Power. The results agree well with other published data on smoke emissions from Allison T56 engines. They confirm that the engines all emit smoke at a level which is both above the US EPA (1973) limit for smoke emissions for the T56 engine and well above the visible threshold for the engine fitted to the C-130 Hercules aircraft.

WATER TUNNEL EXPERIMENTS

A water tunnel model representing part of the T56 combustion system was designed and built at ARL (Aeronautical Research Laboratory) and tested at the Swinburne Institute of Technology (Melbourne, Australia). The model was based on a carefully designed 60 degree sector of the annular pressure casing of the combustion system. The two plane radial sides and the curved walls representing the inner and outer casing segments were made from Perspex. The metal combustor liner was fitted with cutouts to permit Mylar windows to be inserted to allow the internal flow field to be observed when dye was injected at various stations along the model. The tests carried out with the model were conducted at Reynolds Numbers that ensured that the large scale flow field of the engine was reproduced.

The flow field within the standard combustor was found to be deficient in several aspects.

COMBUSTION RIG TESTS

Apparatus and Test Procedure

The modifications that were developed in the water tunnel were tested in a combustion test rig at ARL for comparison with the performance of a standard combustion system.

Figure 7:
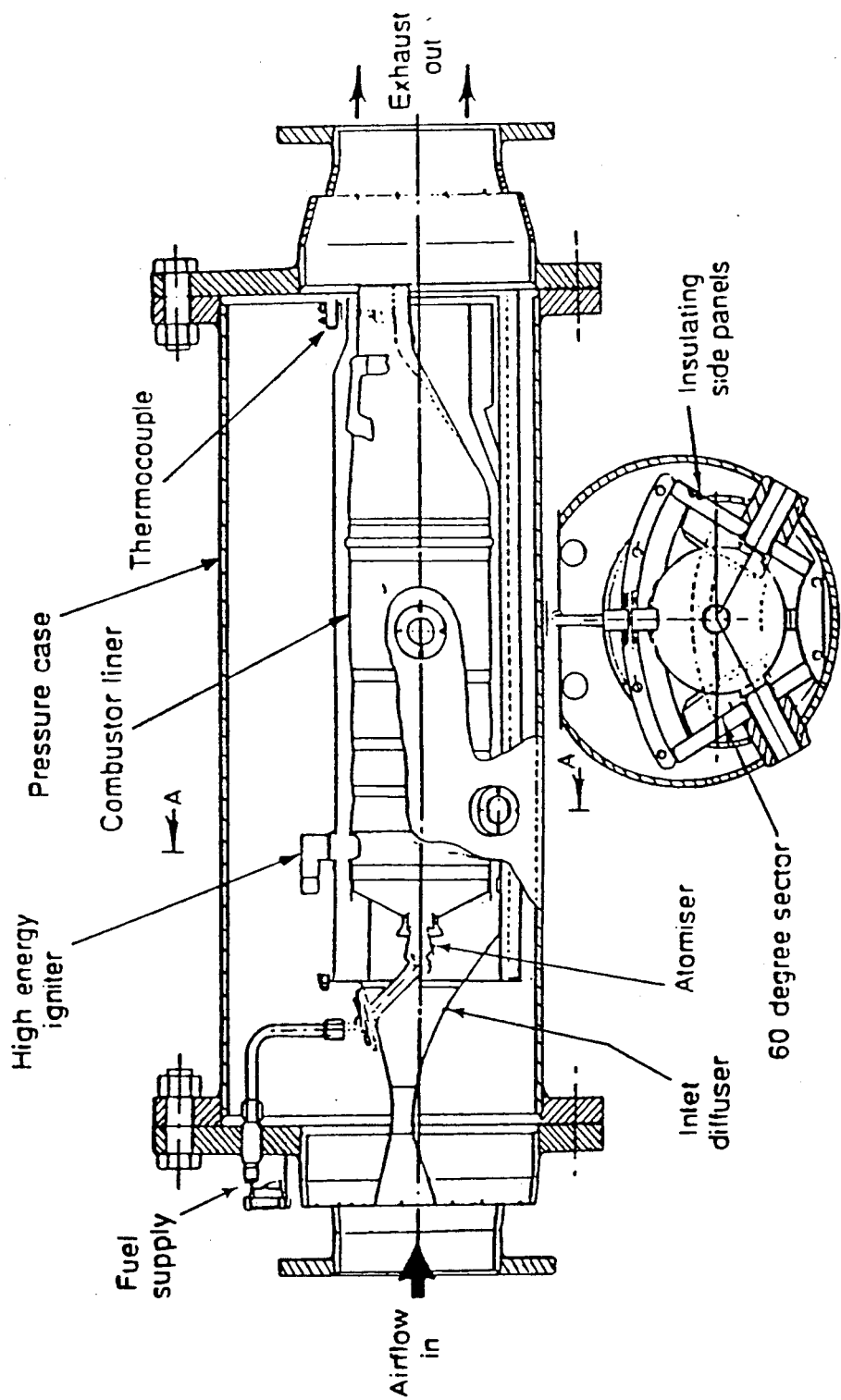
FIG. 7 is a cross-sectional view of the combustion test rig.
Figure 8:
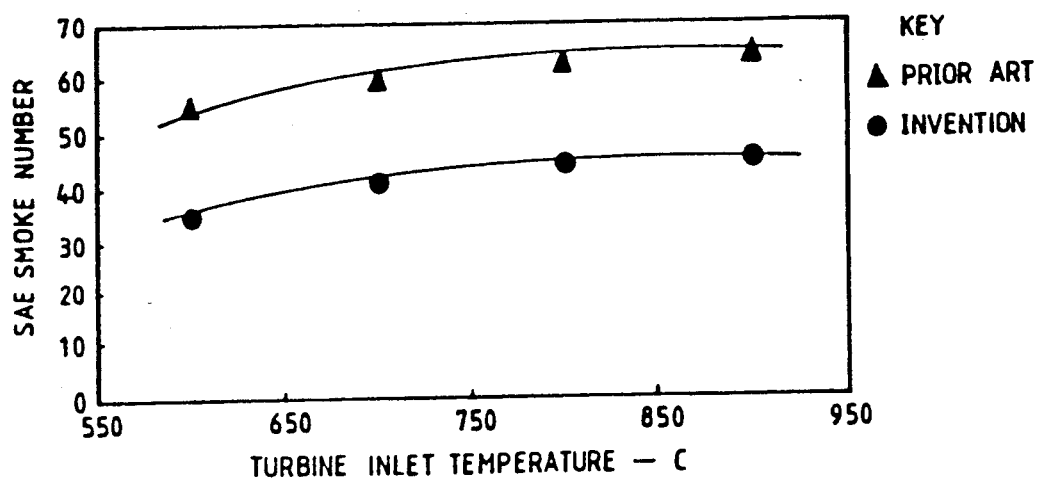
FIGS. 8 to 12 show the results for the improved combustion liner plotted against turbine inlet temperature.

A cross sectional view of the test rig appears in FIG. 7. Like the water tunnel model, the rig is based on a single liner contained in a 60 degree sector of the Allison T56 combustion system. The sector had insulated radial side panels to reduce circumferential heat loss, and both the inner and outer pressure casings of the engine were reproduces in 0.5 mm stainless steel. There were two sectors available for the rig; one accepted Series II combustor liners while the other accepted Series III liners. The sectors were used only to act as guides for airflow through the rig and the pressure was contained by a 300 mm mild steel casing. The inlet diffuser was an exact copy of the actual engine diffuser.

The validity of the combustion rig in representation of part of the full scale engine combustion system, could be assessed in two ways. These were in terms of gaseous and particulate emissions which were similar to published data, and in terms of the distribution of metal temperature on the surface of the combustor liner.

The temperature distribution patterns revealed by thermal paint on the surface of a standard liner after operation in the rig together with the natural metal temperature discolourations on the same liner after operation in an engine were compared. These patterns were essentially the same with even small differences accurately reproduced.

The rig could operate at pressures up to 1000 KPa (150 psi) and with inlet air temperatures up to 350° C. (660° F.). The conditions chosen for these tests were:
air mass flow—2.15 kg/s (4.75 lb/s),
rig inlet pressure—760 KPa (110 psi),
rig inlet temperature—300° C. (570° F.).

This corresponds to an operating condition for the T56 engine at a low level cruise in the P-3 Orion. While it was possible to have rig outlet (or turbine inlet temperatures) up to 1100° C., for this series of tests the outlet temperature was limited to 900° C., corresponding to a power setting just below the normal cruise setting for the engine.

Smoke emissions were determined using the same equipment used in the engine tests. Gaseous emissions were determined using the equipment and procedure described in the SAE;s ARP 1256A (1980).

Results and Discussion

Figure 9:
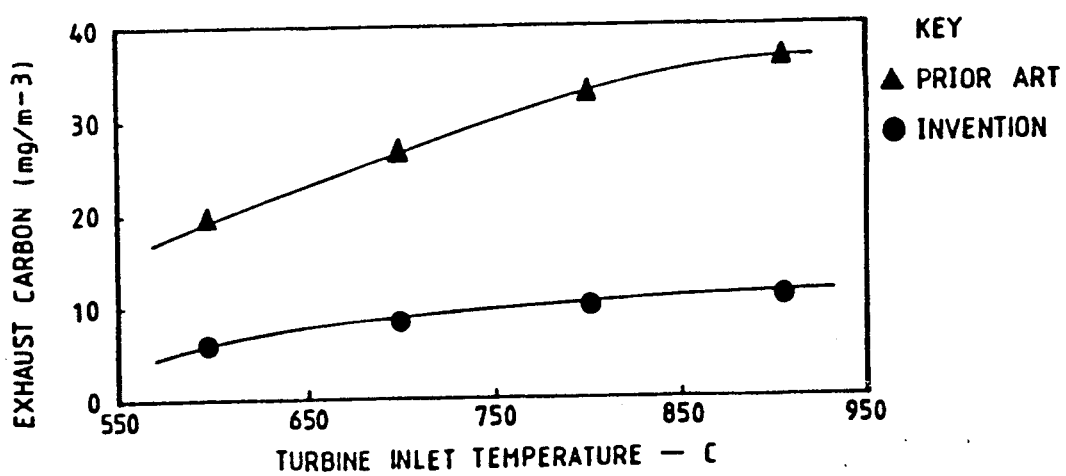
Figure 10:
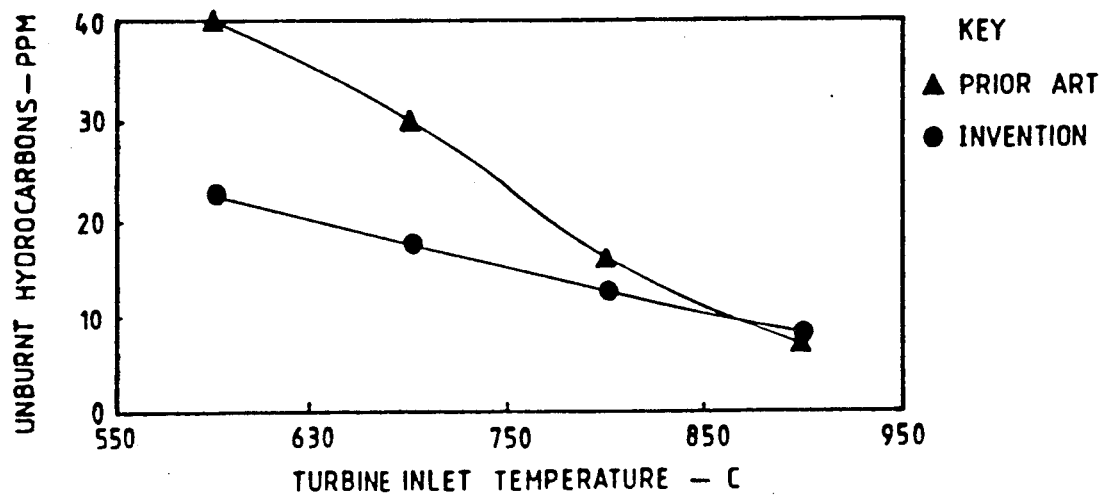
Figure 11:
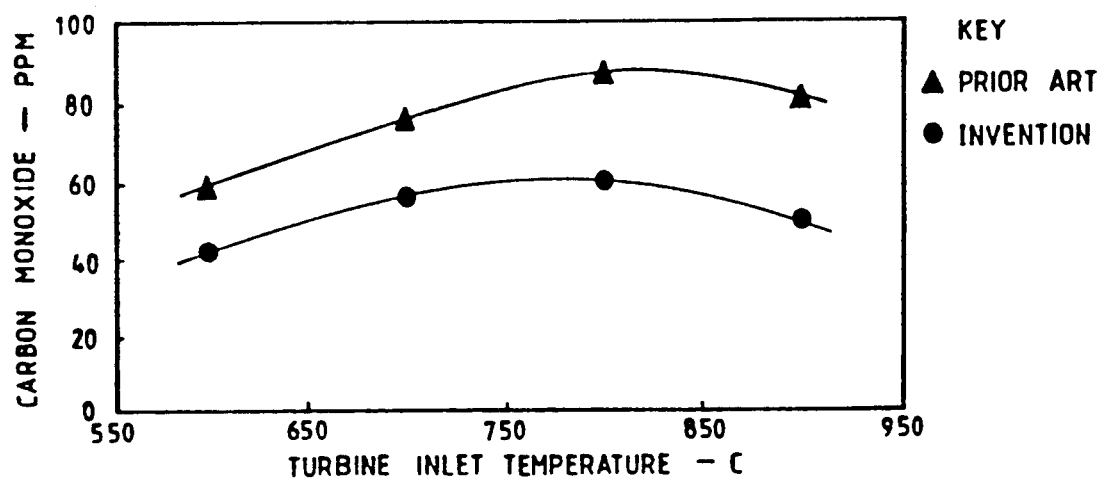
Figure 12:
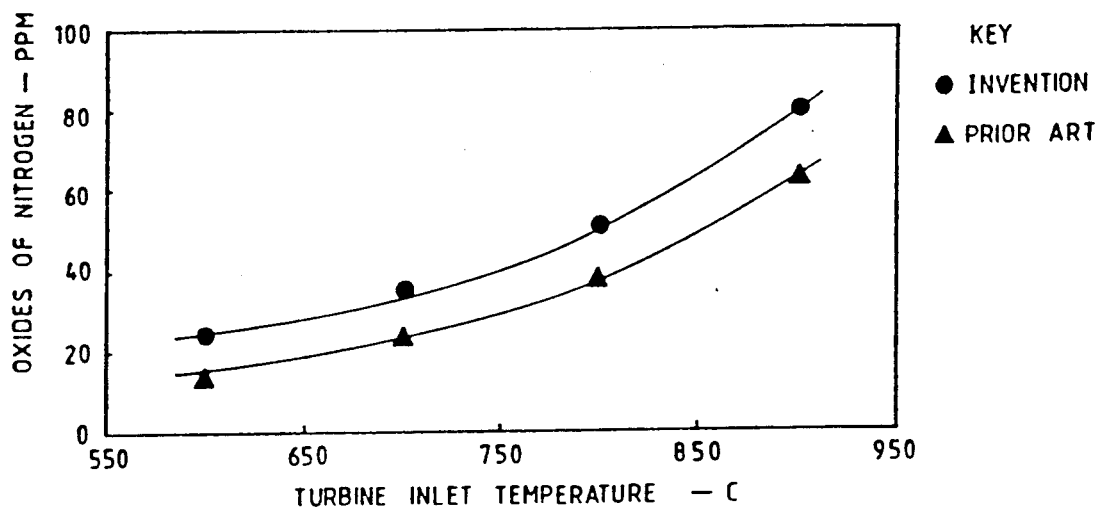

The effectiveness of the improvement was assessed in terms of SAE Smoke Number, gravimetric carbon emissions (smoke), emissions of unburnt hydrocarbons, carbon monoxide and oxides of nitrogen. The results for the improved combustor liner are shown plotted against turbine inlet temperature in FIGS. 8 to 12 respectively. FIG. 9 was obtained by converting the SAE Smoke Number to emissions of carbon.

These results, with the exception of oxides of nitrogen, all show a reduction in emissions. (The level of unburnt hydrocarbons at the highest turbine inlet temperature, FIG. 10, was very low for both the standard and modified liners and probably reflect the background levels of hydrocarbons or oil in the inlet air to the rig rather than an effect due to the modification). The slight increase in oxides of nitrogen indicate a higher flame temperature or an increase in residence time in the combustor which is consistent with a more stable and more efficient combustion mass in the improved combustor. All of the results show that combustion in the new combustor liner had been improved. In particular smoke emissions had been reduced significantly, and the overall results pointed to an increase in combustion efficiency.

MODIFIED ENGINE GROUND TESTS

Scope of Tests

The performance of the improved combustion system was compared with the performance of a standard system in a series of ground run engine trials addressing three aspects. These were:

exhaust smoke emissions, (measured on an open test stand), engine performance and specific fuel consumption, (measured in a calibrated test cell), and, durability of the combustor liner, nozzle guide vanes and turbine blades.

OPEN TEST STAND TRIALS

The open test stand trials were conducted on an Allison T56-A-14 engine (S/N AE 110298) at the RAAF Base in Edinburgh, South Australia. The engine was initially tested in standard form for smoke emissions over the entire power range from low speed ground idle (start position) to maximum power, to establish a valid base-line measurement. This test involved about four hours of engine running. The engine was then dismantled and modified to incorporate the ARL improved low smoke combustor liners established in the ARL laboratory rig tests. Care was then taken to ensure that the engine was rebuilt with all components in exactly the same position, the only difference being the modification to the combustor liners. The engine was then retested at the same conditions that were used previously in testing the standard engine. A fuel sample was collected at the conclusion of each trial and analysed by the Australian Department of Defence, Materials Testing Laboratory in New South Wales for physical and chemical characteristics (including hydrogen and aromatic contents). These analysis are reproduced in Appendix 1. At the conclusion of the smoke reduction trials a durability test commenced.

Results and Discussion—Open Test Stand

Figure 13:
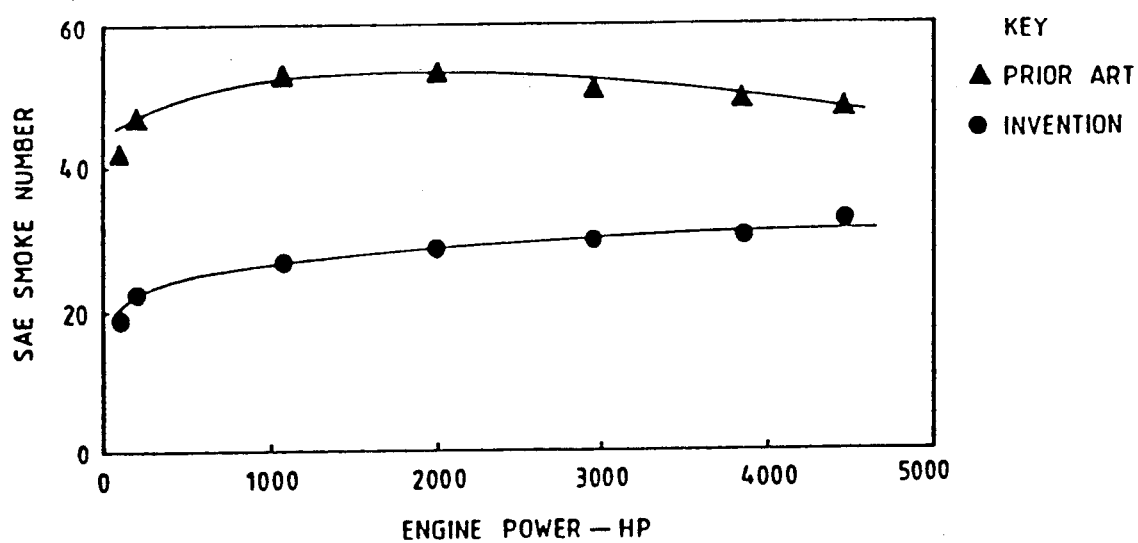
FIG. 13 shows SAE Smoke Number versus Engine Power for both standard and modified engine builds.
Figure 14:
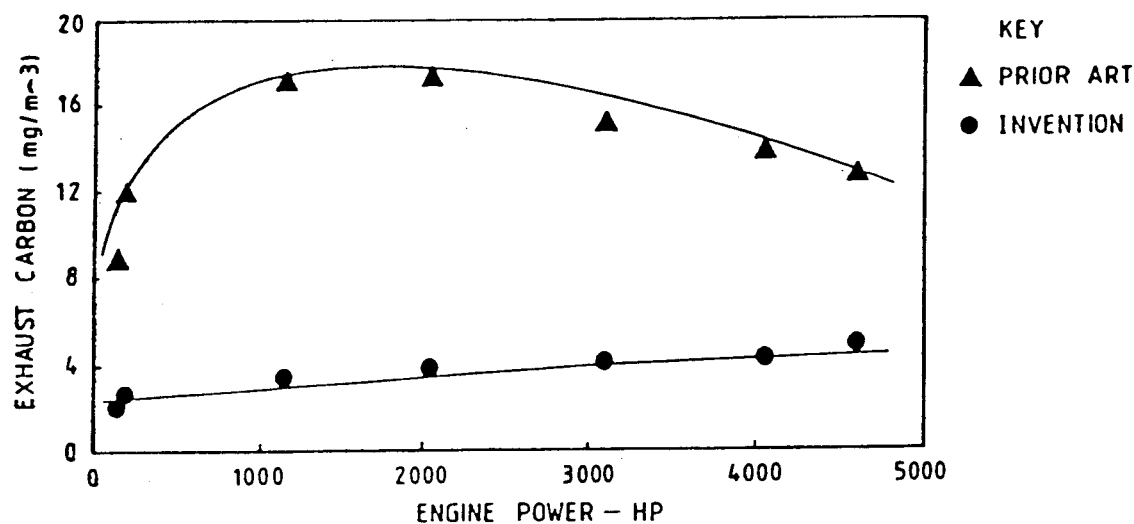
FIG. 14 shows the mass emissions of carbon (smoke) versus Engine Power for both the standard and modified engine builds.
Figure 15:
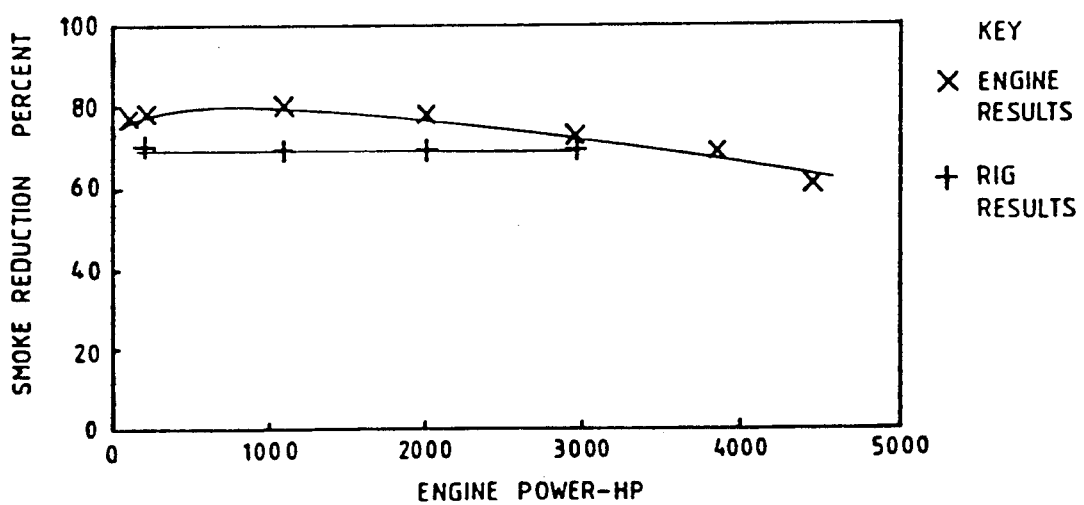
FIG. 15 shows the percentage reduction in mass emissions of carbon attributable to the combustion modification.

The results of the smoke emission tests from the ground run engine for both the standard and modified engine builds are shown in FIG. 13 in terms of SAE Smoke Number versus engine power and in FIG. 14 for mass emissions of carbon (smoke) versus engine power. FIG. 15 shows the percentage reduction in mass emissions of carbon attributable to the combustor modification together with corresponding data from the combustion rig.

These results show that smoke emissions were reduced by a substantial margin over the entire operating range of the engine. The percentage reduction is also in close agreement with the reduction observed in the laboratory rig tests (FIG. 15).

The results of the fuel analysis (Appendix 1) show that the difference in both aromatic and hydrogen content is very small and would have had a negligible effect on smoke emission differences.

The level of smoke emissions from the modified engine approaches the visibility threshold level of the exhaust plume from C-130 Hercules aircraft. No information regarding the visibility threshold level could be found for the P-3 Orion aircraft. However, a comparison of the two engine installations suggest that the P-3 would be more likely to generate discrete smoke trails which would be more likely to be visibile than from the C-130 aircraft.

The smell of unburnt fuel is usually noticeable in the exhaust of standard T56 engines, particularly at low power settings. During the ground trials there was no smell (@) of unburnt fuel in the exhaust of the modified engine at any power setting. This was consistent with the rig results for unburnt hydrocarbon emissions.

DURABILITY TEST

The same modified engine was subjected to an extended run designed to endurance test the improved combustion system and to ensure that it did not reduce the life of the nozzle guide vanes, turbine blades or the actual combustor liners. The test consisted of running the engine for 10 minutes at ground idle (start position) followed immediately by 10 minutes at maximum continuous power (1010° C. turbine inlet temperature). Both increases and decreases in power were carried out as rapidly as possible. This cycle was repeated for approximately, 12 hours per day until 150 hours of engine running time had been accumulated. This testing program was considered to be the equivalent of at least 1000 hours of normal flight operation by the RAAF. During the run, regular boroscope examinations were undertaken of the liner, nozzle guide vanes and first stage turbine blades. Subsequently the engine was dismantled and inspected. Inspection revealed that there was no sign of any distress or any other problem in hot end components. In fact the condition of hot end components appeared to be in significantly better condition than that of a standard engine; this was particularly so for the liners. The modified liners after the 150 hour endurance test were completely free from any cracks or any other sign of distress, whereas the (new) standard liners that had been run for only about four hours all contained cracks in the area near the exhaust.

The smell of unburnt hydrocarbons can be an operational problem for C-130 that are taxying for extended periods with troops on board and the rear ramp deployed for ventilation. The ingestion of the hydrocarbons can reduce the ventilation and affect and lower the efficiency of the troops. It was most noticeable that the modified combustor liners were virtually free from carbon build-up and this contrasted with the standard liners which were coated in carbon.

It is anticipated that the significant reduction in carbon build-up will increase the life of turbine blades and nozzle guide vanes. This anticipation is based on evidence that the protective coatings on these components are eroded by carbon particles which decreases the life of the coatings.

PERFORMANCE TESTS

The modified engine was installed in the calibrated T56 test cell at QANTAS in Sydney, and subjected to a series of performance measurements. The engine was then returned to standard configuration and retested for performance. Subsequently another T56-A-14 and a T56-A-15 engine were tested with modified liners in the calibrated test cell to expand the data base on engine performance with the modified liners.

The results in terms of the percentage improvement in corrected specific fuel consumption versus turbine inlet temperature are presented in FIG. 16 for the three modified engines. FIG. 17 provides the same information but as an average of the results for the three engines. The results demonstrate that, for the engines tested, specific fuel consumption was reduced by approximately 1% at the normal cruise condition for the engine.

FLIGHT TRIALS

Scope of Flight Tests

At the conclusion of the calibrated test cell runs, the first engine (S/N AE 110298) was again rebuilt to the low smoke configuration and fitted to number 3 position on the RAAF's P-3C Orion aircraft, A9-661. Engine performance and behaviour were monitored using standard aircraft instrumenration that had been calibrated. A video camera mounted behind the co-pilot was used to record the engine instrumentation parameters. A second hand-held video camera was also used on some tests to record instrument and general flight information. Flight trials were conducted under RAAF Special Technical Instruction TI 1045 (1989).

The trials were conducted in two phases. The first phase was based on the standard flight test following an engine change as required by the P-3C Flight Manual (RAAF, 1983) and included safety checks of the relight cability of the engine. The second phase was designed to test the modified engine throughout the flight envelope of the P-3C aircraft to ensure that relight or flameout characteristics of the engine were not compromised.

A chase aircraft was used to record, photographically, variations in smoke emissions from the engines in flight. Photographic and video recordings were also taken from the ground during take-offs and landings and also during a series of fly-overs.

The program for the second series of tests included:
(i) A series of tests to identify any changes in the relight characteristics of the modified engine. This was achieved by flying the aircraft at 30,000 ft. with an indicated airspeed of 170 KTS and shutting down an unmodified engine for 30 minutes to allow the engine to be cold soaked. The engine was then restarted and the following recorded: (1) time to start, (2) maximum peak turbine inlet temperature reached during start up, and (3) the time for the temperature to stabilise following ignition. This procedure was then repeated with the modified engine. The test was then repeated at 20,000, 10,000 and 500 feet altitude for both standard and modified engines.
(ii) A test requiring the aircraft to be flown at maximum speed at altitudes of 30,000, 20,000, 10,000 and 500 feet and reducing power on engines number 2 and 3 (standard and modified) as rapidly as possible to check for possible lean extinction.
(iii) A series of tests including aircraft stalls, negative and positive accelerations, full reverse power operation, and general rough handling.
(iv) A ground test requiring the aircraft to pass through the aircraft washing facility (bird bath) with all engines operating.

Results and Discussion

Observations from the ground and from the chase aircraft confirmed a significant smoke reduction. Photographic recordings showed a very faint smoke emission from the modified engine but this is minimal compared with the large trails that emanated from the three standard engines.

These tests showed that:
(i) for all tests the modified engine performed within the allowable limits in the flight manual specifications, and,
(ii) the modified engine showed no tendency to flame out during extreme in-flight manoeuvres and operation in the aircraft washing facility.

At the conclusion of the flight tests the RAAF accepted the modified engine for normal squadron operation without restrictions or further testing apart from routine maintenance. The engine has completed over 250 hours on-wing. Boroscope examination showed that carbon build-up within the combustor was still very light compared to standard systems, and was confined to small areas unlike the standard combustor which tends to have large areas covered in carbon with areas of heavy carbon build-up.

In conclusion, data have been accumulated to demonstrate that the low smoke modification for the Allison T56 Series III engines reduces smoke emissions from the engine by 80% at cruise power settings to about 70% at high power settings. The modification at the same time reduces the specific fuel consumption by about 1% at cruise condition. Flight and endurance trials have not revealed any reduction in performance or durability aspects of the modified engine, on the contrary, the modification appears to have increased the durability of the hot end components. The present evidence for this is the absence of liner cracking and a marked reduction in carbon build-up. The engine is easier to start, has lower peak start up temperatures and emits no smoke during start up. The engine is also less smelly due to the reduction of unburnt hydrocarbon emissions.

I claim:
1. An Allison T56 single spool gas turbine engine, comprising:
 a can-annular combustion system having a plurality of combustion liners, said combustion liners including primary, secondary and dilution zones having apertured air inlets, said primary zones having cooling corrugations; and
 air inlet apertures having inwardly extending flanges with diameters of 9 to 15 mm located in said primary zones of said combustion liners, with outer edges of said air inlet apertures being between 0.5 mm and 1.00 mm forward of said cooling corrugations in said primary zones;
 whereby smoke emissions and fuel consumption are reduced.
2. An Allison T56 single spool gas turbine engine according to claim 1 wherein said air inlet apertures in each of said primary zones number seven.

* * * * *